United States Patent
Adams et al.

(10) Patent No.: US 8,840,274 B1
(45) Date of Patent: Sep. 23, 2014

(54) METHOD AND APPARATUS FOR A PROTECTIVE CASE INCLUDING AN OPTICAL SYSTEM

(71) Applicants: Stephen P. Adams, Mesa, AZ (US); Taylor W. Anderson, Mesa, AZ (US)

(72) Inventors: Stephen P. Adams, Mesa, AZ (US); Taylor W. Anderson, Mesa, AZ (US)

(73) Assignee: JST Performance, Inc., Gilbert, AZ (US)

( * ) Notice: Subject to any disclaimer, the term of this patent is extended or adjusted under 35 U.S.C. 154(b) by 0 days.

(21) Appl. No.: 14/154,003

(22) Filed: Jan. 13, 2014

(51) Int. Cl.
*F21V 17/02* (2006.01)
*F21L 4/00* (2006.01)
*F21V 5/04* (2006.01)
*F21K 99/00* (2010.01)

(52) U.S. Cl.
CPC . *F21V 17/02* (2013.01); *F21L 4/00* (2013.01); *F21V 5/045* (2013.01); *F21K 9/50* (2013.01)
USPC ....... 362/280; 362/319; 362/330; 362/311.02

(58) Field of Classification Search
USPC ............. 362/277, 280, 319, 236, 330, 311.02
See application file for complete search history.

(56) References Cited

U.S. PATENT DOCUMENTS

| | | | | |
|---|---|---|---|---|
| 7,664,865 | B2 * | 2/2010 | Parikh et al. | 709/229 |
| 7,914,169 | B2 * | 3/2011 | Hesse et al. | 362/187 |
| 8,152,327 | B2 * | 4/2012 | Brands et al. | 362/187 |
| 8,485,683 | B2 * | 7/2013 | Popper et al. | 362/188 |
| 2003/0081411 | A1 * | 5/2003 | Noda et al. | 362/155 |
| 2013/0208481 | A1 * | 8/2013 | Sooferian | 362/280 |

* cited by examiner

*Primary Examiner* — Laura Tso

(57) ABSTRACT

An electronics package includes an electronic component having a light emitting diode (LED) and a protective case encapsulating the electronic component. An optical system is arranged between the electronic component and the protective case. The optical system is maneuvered to one of multiple positions via an actuator that is coupled to the optical system, where the actuator is accessible external to the protective case by the user of the electronics package. A first position of the optical system allows the light generated by the LED to be collected and/or controlled by the optical system. A second position of the optical system allows the light generated by the LED to be unaffected by the optical system. A third position of the optical system allows at least a portion of the light generated by the LED to be collected and/or controlled by the optical system and the remaining portion to be unaffected.

30 Claims, 3 Drawing Sheets

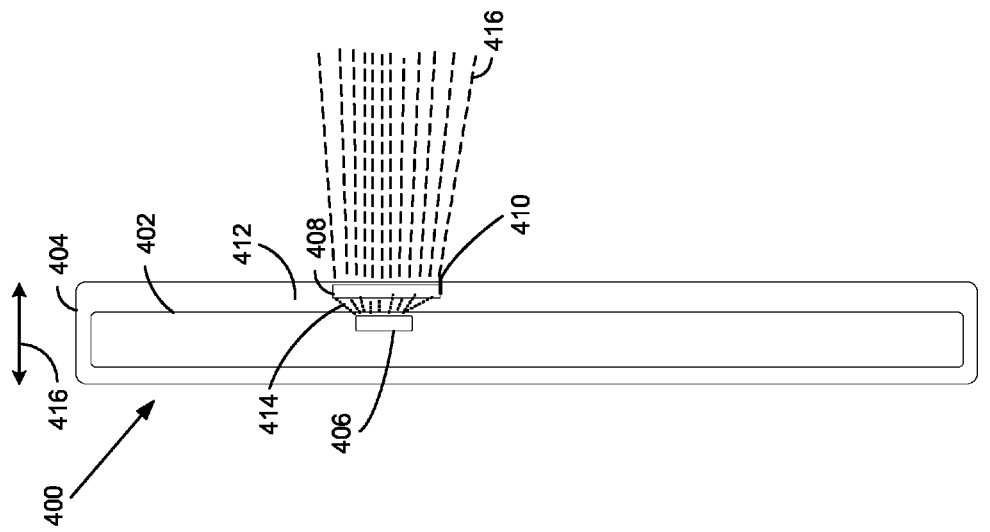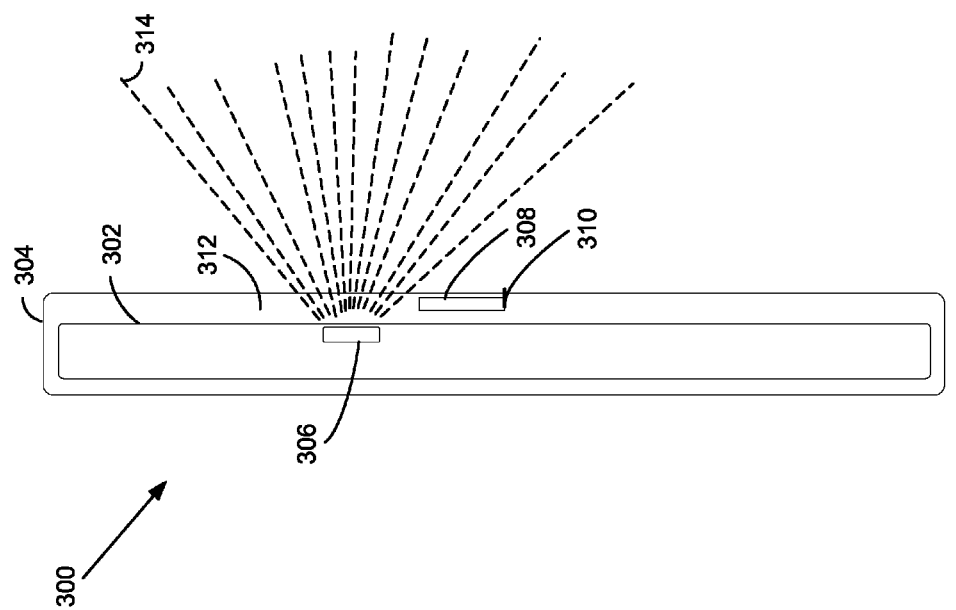

METHOD AND APPARATUS FOR A PROTECTIVE CASE INCLUDING AN OPTICAL SYSTEM

FIELD OF THE INVENTION

The present invention generally relates to lighting systems, and more particularly to light collection and projection systems.

BACKGROUND

Light emitting diodes (LEDs) have been utilized since about the 1960s. However, for the first few decades of use, the relatively low light output and narrow range of colored illumination limited the LED utilization role to specialized applications (e.g., indicator lamps). As light output improved, LED utilization within other lighting systems, such as within LED "EXIT" signs and LED traffic signals, began to increase. Over the last several years, the white light output capacity of LEDs has more than tripled, thereby allowing the LED to become the lighting solution of choice for a wide range of lighting solutions.

LEDs exhibit significantly optimized characteristics for use in lighting fixtures, such as source efficacy, optical control and extremely long operating life, which make them excellent choices for general lighting applications. LED efficiencies, for example, may provide for light output magnitudes that may exceed 100 lumens per watt of power dissipation. Energy savings may, therefore, be realized when utilizing LED-based lighting systems as compared to the energy usage of, for example, incandescent, halogen, compact fluorescent and mercury lamp lighting systems. As per an example, an LED-based lighting fixture may utilize a small percentage (e.g., 10-15%) of the power utilized by an incandescent bulb, but may still produce an equivalent magnitude of light.

LEDs may be mounted to a printed circuit board (PCB), which may include conductive regions (e.g., conductive pads) and associated control circuitry. The LED control terminals (e.g., the anode and cathode terminals of the LEDs) may be interconnected via the conductive pads, such that power supply and bias control signals may be applied to transition the LEDs between conductive and non-conductive states, thereby illuminating the LEDs on command.

The photometric distribution of a forward-biased LED may produce an omnidirectional pattern of light (e.g., a 180 degree spread of light emanating in all directions from a surface of the PCB upon which the LED is mounted). In order to modify such an omnidirectional photometric distribution, a plastic dome (e.g., an injection molded acrylic plastic cover) may be placed over the LED. In so doing, for example, the plastic dome may modify the photometric distribution pattern from that of an omnidirectional pattern to one of a non-omnidirectional pattern (e.g., a 120 degree spread of light emanating from a surface of the PCB).

Many applications, however, prevent the usage of optics to further modify the photometric distribution pattern due to the compact nature of the application. For example, packaging (e.g., protective cases) for various electronic components (e.g., cell phones) may restrict one or more dimensions of the case (e.g., thickness) which precludes placement of supplemental optics within the case due to an excessive thickness that placement of the supplemental optics may create.

Efforts continue, therefore, to develop optical systems that may be employed within electronics packaging that may be easily deployable within the packaging and that may not excessively increase any dimension of the packaging.

SUMMARY

To overcome limitations in the prior art, and to overcome other limitations that will become apparent upon reading and understanding the present specification, various embodiments of the present invention disclose methods and apparatus for the placement of optical systems within protective cases.

In accordance with one embodiment of the invention, an electronics package comprises an electronic component having an LED and a case encapsulating the electronic component. The case includes an optical system disposed between the electronic component and the case and an actuator coupled to the optical system. The optical system is maneuvered to first and second positions via the actuator, the first position being more proximate to the LED as compared to the second position.

In accordance with another embodiment of the invention, a method comprises disposing an electronic component within a protective case, disposing an optical system between the electronic component and the protective case, illuminating a light source disposed within the electronic component and adjusting a position of the optical system relative to the light source.

BRIEF DESCRIPTION OF THE DRAWINGS

Various aspects and advantages of the invention will become apparent upon review of the following detailed description and upon reference to the drawings in which:

FIG. 3 illustrates an LED-based electrical component package in accordance with one embodiment of the present invention;

FIG. 4 illustrates an LED-based electrical component package in accordance with one embodiment of the present invention.

DETAILED DESCRIPTION

Generally, the various embodiments of the present invention are applied to a light emitting diode (LED) based lighting system that may contain one or more LEDs and one or more associated lenses. The LEDs may be mounted to a PCB having control and bias circuitry that allows the LEDs to be illuminated on command. A lens may be mounted forward of an associated LED, so as to control a pattern of light that may be projected by each LED of the lighting system.

In one embodiment, the lens may be mounted within a protective case of an electronics package (e.g., within a cell phone case or camera case) such that the lens may be maneuvered to at least two positions within the protective case. In a first position, for example, the lens may be maneuvered within the protective case to be forward of one or more associated LEDs, such that the lens may collect and control at least a portion of the light emitted by the associated LEDs. In a second position, for example, the lens may be maneuvered within the protective case away from the one or more associated LEDs, such that the lens may not collect any portion, or substantially no portion, of the light emitted by the associated LEDs. Accordingly, for example, the lens may be selected within the protective case (e.g., mechanically repositioned within the protective case) to either collect and control at least a portion of the light emitted by one or more associated LEDs of the electronics package or to collect and control substantially no portion of the light emitted by one or more associated LEDs.

Figure 1:
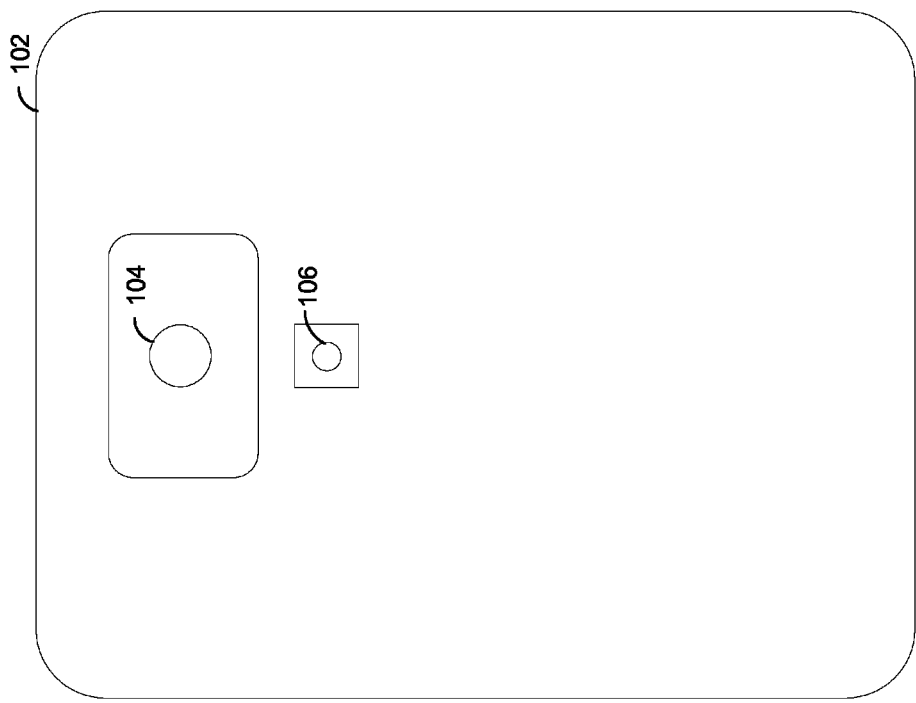
FIG. 1 illustrates an LED-based electrical component in accordance with one embodiment of the present invention.

Turning to FIG. 1, electronic component 102 is illustrated and may represent any number of LED-based electronic components, such as a camera, a mobile telephonic device (e.g., cell phone) or any other mobile electronics device, such as an electronic tablet, an MP3 player, a recording device or a flashlight. Electronic component 102 may include, for example, an optical input device (e.g., camera lens 104) and an optical output device (e.g., light emitting diode (LED) 106). LED 106 may, for example, be used to augment the performance of camera lens 104 by illuminating the object of focus of camera lens 104. LED 106 may, for example, be used by itself for other purposes, which may include use of LED 106 as a flashlight.

Figure 2:
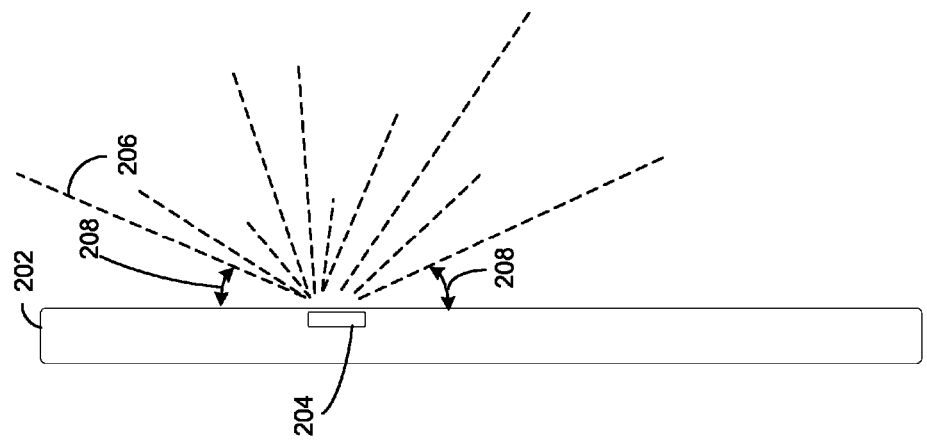
FIG. 2 illustrates a side view of the LED-based electrical component of FIG. 1.

Turning to FIG. 2, a side view of electronic component 202 is illustrated, whereby LED 204 is shown in an illuminated state (e.g., LED 204 is in a conductive state as created by associated LED bias and control circuitry not shown). In particular, light rays 206 may emanate from LED 204 when LED 204 is activated (e.g., a flashlight application may be activated within cell phone 202 such that LED 204 becomes illuminated upon demand of the user of cell phone 202). Light rays 206 may, for example, emanate from electronic component 202 at an angle that may be defined by a dome (not shown), such that the smallest angle (e.g., angle 208) that may exist between a surface of electronic component 202 and any light ray 206 may be a minimum angle between approximately 20 and 40 degrees (e.g., approximately 30 degrees). In other embodiments, LED 204 may not include a dome, such that the smallest angle (e.g., angle 208) that may exist between a surface of electronic component 202 and any light ray 206 may be a minimum angle of approximately 0 degrees. Accordingly, LED 204 of electronic component 202 may be used to augment the functionality of electronic component 202 during its operation (e.g., as a flashlight, as a camera or as a cell phone being used as a flashlight).

Turning to FIG. 3, electronics package 300 is illustrated which may include electronic component 302 and protective case 304 (e.g., a case that temporarily encapsulates electronic component 302 to protect electronic component 302 from damage that may be caused by exposure to shock, vibration and/or environmental elements such as ultraviolet radiation (UV), snow, sleet or rain). Optical system 308 may be encapsulated between protective case 304 and electronic component 302 (e.g., within channel 312) and may be actuated by actuator 310. For example, actuator 310 may be connected to optical system 308 and may be provided to an external portion of protective case 304 (e.g., actuator 310 may extend through a slot provided within protective case 304). Accordingly, for example, a user of electronic component 302 may apply force (e.g., apply an upward or downward force to actuator 310 using a thumb or finger) to slide optical system 308 up and down within channel 312 that may be defined between electronic component 302 and protective package 304.

As depicted in FIG. 3, optical system 308 may be selected to a first position (e.g., optical system 308 is not deployed) by the user of electronics package 300. Accordingly, for example, optical system 308 may be removed from the vicinity of LED 306 such that substantially no portion of light rays 314 may be collected and/or controlled by optical system 308. In such an instance, light rays 314 may emanate from LED 306 at virtually any angle between approximately 0 degrees and 180 degrees (e.g., approximately a 120 degree spread) relative to a surface of protective case 304.

As depicted in FIG. 4, for example, optical system 408 may be selected to a second position (e.g., deployed by mechanical actuation of optical system 408 within channel 412 via actuator 410) by the user of electronics package 400. Accordingly, for example, optical system 408 may be placed within the vicinity of LED 406 such that substantially all light rays 414 may be collected and/or controlled by optical system 408. In such an instance, light rays 414 may emanate from LED 406 at virtually any angle between approximately 0 degrees and 180 degrees (e.g., approximately a 120 degree spread) relative to a surface of electronic component 402. Optical system 408 may then collect and/or control light rays 414 into a controlled light beam 416 having a tighter beam pattern (e.g., a beam pattern having less than a 120-degree spread angle such as a 10-degree spread angle) as compared to the beam pattern of light rays 414. In one embodiment, controlled light beam 416 may result from a Fresnel-based optical system 408, but virtually any lens that may be used to collect and/or control light rays 414 may be used.

In alternate embodiments, optical system 408 may collect and/or control only a portion of light rays 414 and may not collect and/or control the remaining portion of lights rays 414. Accordingly, for example, light emanating from LED 406 may include a portion of uncontrolled light (e.g., light rays 414) and a portion of controlled light (e.g., light rays 416).

Figure 5:
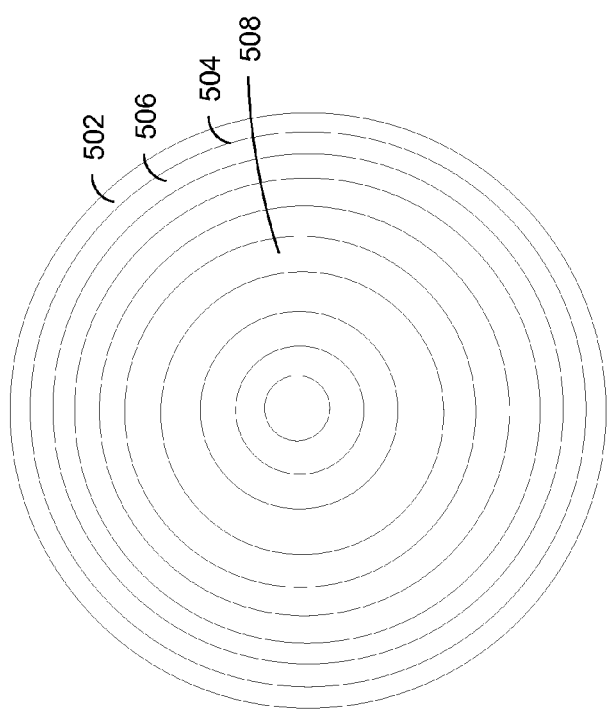
FIG. 5 illustrates an optical system in accordance with one embodiment of the present invention.

Turning to FIG. 5, a top-view of an optical system is illustrated, which in one embodiment, may include Fresnel lens 500. Fresnel lens 500 may, for example, be used to minimize a thickness of lens 500 by utilizing a set of concentrically arranged lenses. Each lens (e.g., lenses 502 and 506) may maintain the same curvature as compared to a conventional lens, but may be separated by stepwise discontinuities 504 that may allow one lens (e.g., lens 502) to be arranged at the same height as an adjacent lens (e.g., lens 506). Accordingly, for example, lens 500 may be configured to be much thinner and, therefore, much less voluminous as compared to a conventional lens.

Each lens may, for example, be arranged at different angles, where steeper angles may be arranged at the periphery of lens 500 (e.g., lens 502) while more shallow angles may be arranged toward the center of lens 500 (e.g., lens 508). Accordingly, light incident at any angle (e.g., a wide-angle beam pattern) on one side of Fresnel lens 500 may be collected and controlled into light having a tighter beam pattern on the opposite side of Fresnel lens 500.

Turning back to FIG. 4, a thin lens (e.g., Fresnel lens 500) may be used to implement optical system 408. As such, the thickness of electronics package 400 (e.g., thickness 416) may be reduced through the use of Fresnel lens 500, which may be implemented at a reduced thickness as compared to a conventional lens. Accordingly, for example, use of a Fresnel lens for optical system 408 may allow the thickness of protective case 404 to be substantially the same thickness as may be realized by a protective case having no optical system at all.

Other aspects and embodiments of the present invention will be apparent to those skilled in the art from consideration of the specification and practice of the invention disclosed herein. It is intended, therefore, that the specification and illustrated embodiments be considered as examples only, with a true scope and spirit of the invention being indicated by the following claims.

What is claimed is:

1. An electronics package, comprising:
    an electronic component having an LED, wherein the electronic component is a cell phone; and
    a case encapsulating the electronic component, the case including,
        an optical system disposed between the electronic component and the case; and
        an actuator coupled to the optical system, wherein the optical system is maneuvered to first and second positions via the actuator, the first position being more proximate to the LED as compared to the second position.

2. The electronics package of claim 1, wherein the optical system comprises a Fresnel lens.

3. The electronics package of claim 1, wherein the first position allows light from the LED to be collected by the optical system.

4. The electronics package of claim 1, wherein the second position allows light from the LED to be unaffected by the optical system.

5. The electronics package of claim 1, further comprising a channel formed between the electronic component and the case.

6. The electronics package of claim 1, further comprising a channel formed between the electronic component and the case, wherein the optical system is disposed within the channel.

7. The electronics package of claim 1, further comprising a channel formed between the electronic component and the case, wherein the optical system is maneuvered within the channel.

8. The electronics package of claim 1, wherein the actuator extends from the optical system to an exterior portion of the electronics package.

9. The electronics package of claim 1, wherein the actuator extends from the optical system to an exterior portion of the electronics package via a slot provided within the case.

10. The electronics package of claim 1, wherein the actuator is further maneuvered to a plurality of positions between the first and second positions.

11. A method comprising:
    disposing an electronic component within a protective case,
    wherein the electronic component is a cell phone;
    disposing an optical system between the electronic component and the protective case;
    illuminating a light source disposed within the electronic component; and
    adjusting a position of the optical system relative to the light source.

12. The method of claim 11, further comprising controlling at least a portion of the illumination by adjusting the position of the optical system to be proximate to the light source.

13. The method of claim 11, further comprising adjusting the position of the optical system away from the light source to not affect the illumination.

14. The method of claim 11, further comprising controlling at least a portion of the illumination with the optical system by focusing at least a portion of the illumination into a beam pattern having a spread lower than a spread angle of the illumination.

15. The method of claim 11, further comprising controlling substantially no portion of the illumination.

16. An electronics package, comprising:
    an electronic component having an LED, wherein the electronic component is an electronic tablet; and
    a case encapsulating the electronic component, the case including,
        an optical system disposed between the electronic component and the case; and
        an actuator coupled to the optical system, wherein the optical system is maneuvered to first and second positions via the actuator, the first position being more proximate to the LED as compared to the second position.

17. The electronics package of claim 16, wherein the optical system comprises a Fresnel lens.

18. The electronics package of claim 16, wherein the first position allows light from the LED to be collected by the optical system.

19. The electronics package of claim 16, wherein the second position allows light from the LED to be unaffected by the optical system.

20. The electronics package of claim 16, further comprising a channel formed between the electronic component and the case.

21. The electronics package of claim 16, further comprising a channel formed between the electronic component and the case, wherein the optical system is disposed within the channel.

22. The electronics package of claim 16, further comprising a channel formed between the electronic component and the case, wherein the optical system is maneuvered within the channel.

23. The electronics package of claim 16, wherein the actuator extends from the optical system to an exterior portion of the electronics package.

24. The electronics package of claim 16, wherein the actuator extends from the optical system to an exterior portion of the electronics package via a slot provided within the case.

25. The electronics package of claim 16, wherein the actuator is further maneuvered to a plurality of positions between the first and second positions.

26. A method comprising:
    disposing an electronic component within a protective case,
    wherein the electronic component is an electronic tablet;
    disposing an optical system between the electronic component and the protective case;
    illuminating a light source disposed within the electronic component; and
    adjusting a position of the optical system relative to the light source.

27. The method of claim 26, further comprising controlling at least a portion of the illumination by adjusting the position of the optical system to be proximate to the light source.

28. The method of claim 26, further comprising adjusting the position of the optical system away from the light source to not affect the illumination.

29. The method of claim 26, further comprising controlling at least a portion of the illumination with the optical system by focusing at least a portion of the illumination into a beam pattern having a spread lower than a spread angle of the illumination.

30. The method of claim 26, further comprising controlling substantially no portion of the illumination.

* * * * *